(12) United States Patent
Burns et al.

(10) Patent No.: US 7,293,798 B2
(45) Date of Patent: Nov. 13, 2007

(54) PYROTECHNIC LINEAR INFLATOR

(75) Inventors: Sean P. Burns, Almont, MI (US); Jeffrey W. Halpin, Harrison Township, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 275 days.

(21) Appl. No.: 11/099,035

(22) Filed: Apr. 4, 2005

(65) Prior Publication Data

US 2005/0218638 A1    Oct. 6, 2005

Related U.S. Application Data

(60) Provisional application No. 60/559,591, filed on Apr. 5, 2004.

(51) Int. Cl.
*B60R 21/26* (2006.01)

(52) U.S. Cl. .............. 280/741; 280/736; 280/740; 280/742

(58) Field of Classification Search ........... 280/736, 280/740, 741, 742; 102/530, 531
See application file for complete search history.

(56) References Cited

U.S. PATENT DOCUMENTS

| 3,397,639 A | 8/1968 | Alderfer |
| 3,606,377 A | 9/1971 | Martin |
| 3,721,456 A | 3/1973 | McDonald |
| 3,733,088 A | 5/1973 | Stephenson |

(Continued)

FOREIGN PATENT DOCUMENTS

JP    5-64015    8/1993

OTHER PUBLICATIONS

U.S. Appl. No. 11/191,291, filed Jul. 27, 2005, Khandhadia et al.

*Primary Examiner*—Paul N. Dickson
*Assistant Examiner*—Toan C. To
(74) *Attorney, Agent, or Firm*—L.C. Begin & Associates, PLLC (57) ABSTRACT

An inflator (10) for use in an inflatable vehicle occupant protection system. The inflator (10) includes a longitudinal enclosure (22) and a first gas generant (24) positioned along the enclosure (22). Enclosure gas exit apertures (40) are arranged along the enclosure (22) to enable fluid communication between the enclosure (22) and an exterior of the enclosure. And to provide controlled venting of combustion gases from the enclosure (22) as the first gas generant composition (24) burns, thereby controlling the speed and direction of combustion propagation of the first gas generant. Combustion of the first gas generant (24) results in an inflator housing internal pressure of at least a first predetermined minimum internal pressure. The second gas generant composition (91) is also configured to combust to generate inflation gas providing at least a second predetermined minimum internal pressure in the housing, the second predetermined minimum internal pressure being higher than the first predetermined minimum internal pressure. As combustion of first gas generant (24) nears completion, flame from combustion of the first gas generant composition (24) reaches the end (22b) of the enclosure (22) and contacts the second gas generant composition (91), igniting the second gas generant (91) and producing a burst of gas and a resulting in an increase in inflator housing internal pressure. Gas exit apertures (20) along the housing (12) are sized such that the housing internal pressure is maintained at at least the first predetermined minimum level after passage of a predetermined time period after inflator activation.

18 Claims, 3 Drawing Sheets

U.S. PATENT DOCUMENTS

| | | |
|---|---|---|
| 3,785,674 A | 1/1974 | Poole et al. |
| 3,799,573 A | 3/1974 | Olsson et al. |
| 3,897,961 A | 8/1975 | Leising et al. |
| 3,904,221 A | 9/1975 | Shiki et al. |
| 3,929,074 A | 12/1975 | San Miguel |
| 3,986,808 A | 10/1976 | Keith |
| 4,005,876 A | 2/1977 | Jorgensen et al. |
| 4,012,211 A | 3/1977 | Goetz |
| 4,200,615 A | 4/1980 | Hamilton et al. |
| 4,322,385 A | 3/1982 | Goetz et al. |
| 4,358,998 A | 11/1982 | Schneiter et al. |
| 4,781,645 A | 11/1988 | Kato |
| 4,846,368 A | 7/1989 | Goetz |
| 4,878,690 A | 11/1989 | Cunningham |
| 4,890,860 A | 1/1990 | Schneiter |
| 4,950,458 A | 8/1990 | Cunningham |
| 5,094,475 A | 3/1992 | Olsson et al. |
| 5,101,730 A | 4/1992 | Bender et al. |
| 5,109,772 A | 5/1992 | Cunningham et al. |
| 5,139,588 A | 8/1992 | Poole |
| 5,211,224 A | 5/1993 | Bouldin |
| 5,308,370 A | 5/1994 | Kraft et al. |
| 5,322,322 A | 6/1994 | Bark et al. |
| 5,324,071 A | 6/1994 | Gotomyo et al. |
| 5,345,873 A | 9/1994 | Lauritzen et al. |
| 5,368,329 A | 11/1994 | Hock |
| 5,409,259 A | 4/1995 | Cunningham et al. |
| 5,439,250 A | 8/1995 | Kokeguchi et al. |
| 5,443,286 A | 8/1995 | Cunningham et al. |
| 5,462,308 A | 10/1995 | Seki et al. |
| 5,464,249 A | 11/1995 | Lauritzen et al. |
| 5,482,315 A | 1/1996 | Chandler et al. |
| 5,503,079 A | 4/1996 | Kishi et al. |
| 5,503,428 A | 4/1996 | Awotwi et al. |
| 5,503,806 A | 4/1996 | Fulmer et al. |
| 5,540,154 A | 7/1996 | Wilcox et al. |
| 5,540,459 A | 7/1996 | Daniel |
| 5,542,704 A | 8/1996 | Hamilton et al. |
| 5,547,638 A | 8/1996 | Rink et al. |
| 5,551,343 A | 9/1996 | Hock et al. |
| 5,562,303 A | 10/1996 | Schleicher et al. |
| 5,573,271 A | 11/1996 | Headly |
| 5,578,787 A | 11/1996 | Kobari et al. |
| 5,588,670 A | 12/1996 | Storey et al. |
| 5,588,672 A | 12/1996 | Karlow et al. |
| 5,607,181 A | 3/1997 | Richardson et al. |
| 5,615,914 A | 4/1997 | Galbraith et al. |
| 5,623,115 A | 4/1997 | Lauritzen et al. |
| 5,626,360 A | 5/1997 | Lauritzen et al. |
| 5,635,665 A | 6/1997 | Kishi et al. |
| 5,735,572 A | 4/1998 | Clark et al. |
| 5,743,556 A | 4/1998 | Lindsay et al. |
| 5,752,715 A | 5/1998 | Pripps et al. |
| 5,779,263 A | 7/1998 | Lane et al. |
| 5,826,904 A | 10/1998 | Ellis et al. |
| 5,827,996 A | 10/1998 | Yoshida et al. |
| 5,845,933 A | 12/1998 | Walker et al. |
| 5,868,424 A | 2/1999 | Hamilton et al. |
| 5,871,228 A | 2/1999 | Lindsay et al. |
| 5,908,204 A | 6/1999 | Smith |
| 5,941,563 A | 8/1999 | Schoenborn |
| 5,941,752 A | 8/1999 | Liebermann |
| 5,944,343 A * | 8/1999 | Vitek et al. ............... 280/736 |
| 5,967,550 A | 10/1999 | Shirk et al. |
| 6,019,861 A | 2/2000 | Canterberry et al. |
| 6,029,994 A | 2/2000 | Perotto et al. |
| 6,032,979 A | 3/2000 | Mossi et al. |
| 6,039,820 A | 3/2000 | Hinshaw et al. |
| 6,051,158 A | 4/2000 | Taylor et al. |
| 6,053,110 A | 4/2000 | Marchant et al. |
| 6,056,319 A | 5/2000 | Ruckdeschel et al. |
| 6,062,143 A | 5/2000 | Grace et al. |
| 6,077,371 A | 6/2000 | Lundstrom et al. |
| 6,129,023 A | 10/2000 | Marsaud et al. |
| 6,142,518 A | 11/2000 | Butt et al. |
| 6,145,876 A | 11/2000 | Hamilton |
| 6,170,867 B1 | 1/2001 | Rink et al. |
| 6,176,517 B1 | 1/2001 | Hamilton et al. |
| 6,177,028 B1 | 1/2001 | Kanda et al. |
| 6,315,847 B1 | 11/2001 | Lee et al. |
| 6,336,651 B1 | 1/2002 | Mramor et al. |
| 6,347,566 B1 | 2/2002 | Rabotinsky et al. |
| 6,382,661 B1 | 5/2002 | Sutherland |
| 6,412,816 B1 | 7/2002 | Gast et al. |
| 6,416,599 B1 | 7/2002 | Yoshikawa et al. |
| 6,425,601 B1 | 7/2002 | Lewis |
| 6,497,429 B2 | 12/2002 | Matsumoto |
| 6,502,513 B1 | 1/2003 | Barnes et al. |
| 6,595,546 B2 | 7/2003 | Smith |
| 6,595,547 B2 | 7/2003 | Smith |
| 6,601,871 B2 | 8/2003 | Fischer |
| 6,688,231 B1 | 2/2004 | Herrmann |
| 6,752,421 B2 * | 6/2004 | Khandhadia et al. ....... 280/741 |
| 6,755,438 B2 | 6/2004 | Rink et al. |
| 6,805,377 B2 | 10/2004 | Krupp et al. |
| 6,846,013 B2 | 1/2005 | Smith |
| 6,846,014 B2 | 1/2005 | Rink et al. |
| 6,942,261 B2 | 9/2005 | Larsen et al. |
| 7,025,164 B2 | 4/2006 | Takimoto |
| 7,052,041 B2 | 5/2006 | McCormick |
| 2002/0038948 A1 | 4/2002 | Yamanori et al. |
| 2003/0173761 A1 | 9/2003 | Rink et al. |
| 2003/0178828 A1 | 9/2003 | Rink et al. |
| 2003/0197354 A1 | 10/2003 | Belgod et al. |
| 2004/0061316 A1 | 4/2004 | Elgadah et al. |
| 2004/0088457 A1 | 5/2004 | Burns et al. |
| 2005/0104349 A1 | 5/2005 | Stevens et al. |
| 2005/0116454 A1 | 6/2005 | Stevens |
| 2005/0151358 A1 | 7/2005 | Burns |
| 2005/0200103 A1 | 9/2005 | Burns et al. |
| 2005/0218637 A1 | 10/2005 | Burns |
| 2006/0017270 A1* | 1/2006 | Quioc et al. ............... 280/741 |
| 2006/0022444 A1 | 2/2006 | Khandhadia |
| 2006/0138763 A1 | 6/2006 | Brady |
| 2006/0273564 A1* | 12/2006 | McCormick et al. ....... 280/740 |
| 2007/0075535 A1* | 4/2007 | Trevillyan et al. .......... 280/737 |
| 2007/0085309 A1* | 4/2007 | Kelley et al. ............... 280/736 |

* cited by examiner

PYROTECHNIC LINEAR INFLATOR

CROSS REFERENCE TO RELATED APPLICATIONS

This application claims the benefit of provisional application Ser. No. 60/559,591 filed on Apr. 5, 2004.

BACKGROUND OF THE INVENTION

The present invention relates to inflators for vehicle airbags and, more particularly, to a linear inflator which discharges inflation gas along the length of the inflator for use in side impact or head curtain airbag systems.

In certain applications, such as a side-curtain for rollover protection, it is desirable to have an airbag that remains inflated for up to 5-10 seconds. In addition, the same airbag must protect the occupant during the "first impact" stage of an accident, which is typically 0-100 msec. Prior art inventions have solved this problem by using a stored gas inflator with a sealed air bag. In this case, the gas bottle produces relatively cool gas in a short period of time-generating enough pressure to protect the occupant from 0-100 msec. Since the bag is sealed and the gas is cool, the gas pressure in the bag at 5 seconds after impact typically drops to about 50% of the pressure generated during the first impact. The pressure drops primarily because the gas temperature decreases due to heat transfer.

Due to certain disadvantages of a stored gas inflator (size, cost, weight, and reliability for example), it is desirable to use a pyrotechnic inflator for airbag inflation. However, a typical pyrotechnic inflator produces gas that is relatively very hot thereby introducing other engineering concerns. In this case, the first impact pressure is in the desired range, but the gas pressure drops quickly due to heat transfer and the bag pressure at 5 seconds is too low to provide any protection. The pyrotechnic linear inflators described in co-owned and co-pending U.S. application Ser. Nos. 09/846,004, 10/662,771, 60/520,956, and 60/536,134, herein incorporated by reference, provide a significantly cooler gas than typical pyrotechnic inflators and can meet the same requirements as a stored gas inflator in a sealed bag.

Because it is expensive to produce an airbag that is completely sealed, it is desirable to have an inflator that will produce gas for longer than 100 msec., more preferably for longer than 1 second. U.S. application Ser. Nos. 09/846,004, 10/662,771, 60/520,956, and 60/536,134 also describe linear pyrotechnic inflators that will burn for an extended period of time. This is useful, but because some of the propellant burns at a very low pressure, the gaseous effluents may in some circumstances not meet required specifications.

SUMMARY OF THE INVENTION

The present invention describes an inflator that burns for an extended period of time similarly to the aforementioned applications, but also has a secondary charge of propellant that burns quickly beginning 0.5-1 sec. after inflator activation.

The inflator comprises a longitudinal inflator housing including a perforated section to enable fluid communication between an interior of the housing and an exterior of the housing. A longitudinal enclosure extends along a portion of the housing interior, the enclosure having a substantially uniform cross-sectional area along at least a portion of the enclosure. The enclosure includes at least first and second perforated sections to enable fluid communication between the enclosure and an exterior of the enclosure. The first perforated section has a first total gas exit aperture area and the second perforated section having a second total gas exit aperture area, the second total gas exit aperture area being preferably greater than the first total gas exit aperture area. Combustion of the first gas generant results in an inflator housing internal pressure of at least a first predetermined minimum internal pressure.

A first gas generant composition is positioned within the enclosure, the first gas generant composition being distributed substantially uniformly within the enclosure along a first length so as to provide a quantity of first gas generant composition having a first mass of gas generant per unit length of the first length.

A second gas generant composition is positioned so as to enable combustion of the second gas generant composition in response to combustion of the first gas generant composition. The second gas generant preferably extends along a second length which is shorter than the first length along which first gas generant extends. The second gas generant composition is arranged so as to provide a quantity of second gas generant composition having a second mass of gas generant per unit length of the second length, the second mass of gas generant per unit length being greater than the first mass of gas generant per unit length. The second gas generant composition is also physically arranged within the inflator to generate, upon combustion, inflation gas providing at least a second predetermined minimum internal pressure in the housing, the second predetermined minimum internal pressure being higher than the first predetermined minimum internal pressure. As combustion of first gas generant nears completion, flame from combustion of the first gas generant composition ignites the second gas generant, producing a burst of gas resulting in an increase in inflator housing internal pressure to at least the second predetermined minimum internal pressure. Gas exit apertures along the housing are sized such that the housing internal pressure is maintained at at least the first predetermined minimum level after passage of a predetermined time period after inflator activation.

In sum, the present invention includes a gas generator that contains a housing defining a longitudinal enclosure having a first propellant reservoir in fluid communication with a plurality of gas exit orifices, the first propellant reservoir containing a relatively smaller diameter as compared to a second propellant reservoir and the first propellant reservoir being first ignitable; the second propellant reservoir containing a relatively greater diameter and in fluid communication with the first propellant reservoir. Additional propellant reservoirs arranged in alternating smaller diameter and then larger diameter orientation may also be provided in fluid communication with the first and second propellant reservoirs first described. Exemplary gas generant systems include a vehicle occupant protection system containing the gas generator described herein.

BRIEF DESCRIPTION OF THE DRAWINGS

In the drawings illustrating embodiments of the present invention:

FIG. 6 is a cross-sectional side view showing the structure of a second embodiment of a gas generator in accordance with the present invention.

DETAILED DESCRIPTION

Figure 1:
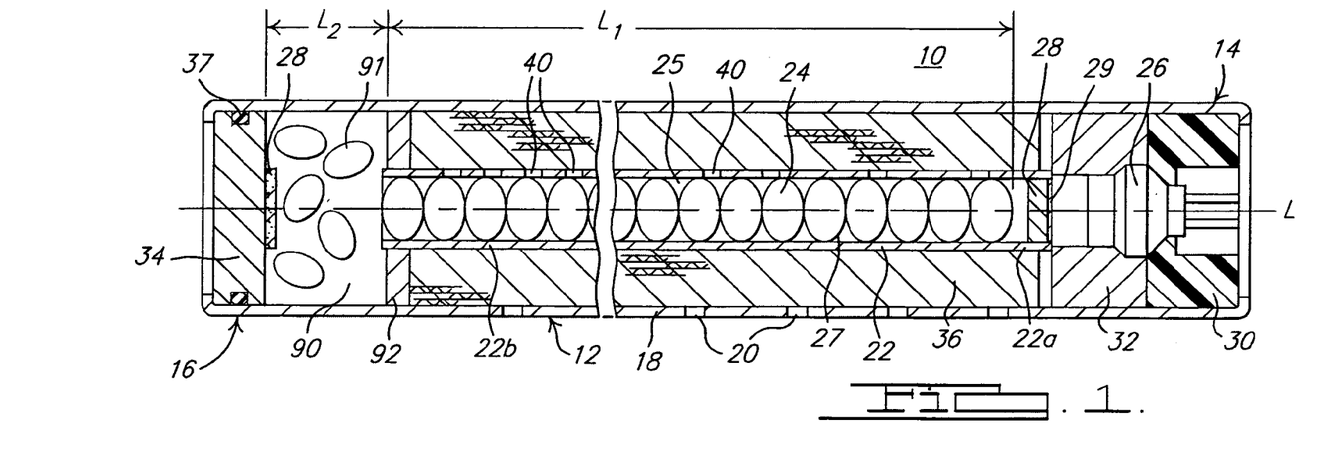
FIG. 1 is a cross-sectional side view showing the general structure of a gas generator in accordance with the present invention.

FIG. 1 shows a cross-sectional view of an inflator 10 in accordance with the present invention. Inflator 10 is preferably constructed of components made from a durable metal such as carbon steel or iron, but may also include components made from tough and impact-resistant polymers, for example. One of ordinary skill in the art will appreciate various methods of construction for the various components of the inflator. U.S. Pat. Nos. 5,035,757, 6,062,143, 6,347,566, U.S. Patent Application Ser. No. 2001/0045735, WO 01/08936, and WO 01/08937 exemplify typical designs for the various inflator components, and are incorporated herein by reference in their entirety, but not by way of limitation.

Referring to FIG. 1, inflator 10 includes a tubular housing 12 having a pair of opposed ends 14, 16 and a housing wall 18 extending along a longitudinal axis L. Housing 12 may be cast, stamped, extruded, or otherwise metal-formed. A plurality of gas exit apertures 20 are formed along housing wall 18 to permit fluid communication between an interior of the housing and an airbag (not shown).

A longitudinal gas generant enclosure 22 is inwardly radially spaced from housing wall 18 and is preferably oriented coaxially with housing wall 18 along longitudinal axis L. Enclosure 22 has an elongate, substantially cylindrical body defining a first end 22a proximate end 14 of housing 12, a second end 22b, and an interior cavity for containing a quantity of a first gas generant composition 24 therein. Enclosure first end 22a is positioned to enable fluid communication between an igniter 26 and the enclosure interior cavity. Enclosure 22 extends along longitudinal axis L from housing end 14 toward housing end 16 and terminates prior to reaching housing end 16, thereby forming a cavity 90 for receiving therein a quantity of a second gas generant composition 91, described in greater detail below. Enclosure 22 is configured to facilitate propagation of a combustion reaction of first gas generant composition 24 along the enclosure, in a manner described in greater detail below. Enclosure 22 may be environmentally sealed at first end 22a with an aluminum tape 29 or any other effective seal.

An annular divider 92 is provided intermediate housing ends 14 and 16 for positioning and securing enclosure second end 22b within housing 12. Divider 92 may be cast, stamped, or otherwise metal-formed.

A first plurality of gas generant tablets 24 are preferably stacked side by side substantially uniformly within enclosure 22 along a first length $L_1$ so as to provide a quantity of first gas generant composition having a first mass of gas generant per unit length of the first length $L_1$. Each tablet 24 preferably has substantially the same dimensions. In one embodiment, each gas generant tablet 24 has an outer diameter of ¼" and a pair of opposing, generally dome-shaped faces 27, providing a maximum tablet width of approximately 0.165" between faces. As seen in FIG. 1, tablets 24 are preferably shaped or configured to advantageously create a cavity 25 between adjacent tablets 24. These cavities 25 provide a volume of air space relative within enclosure 22, thereby enhancing the burn characteristics of tablets 24 when they are ignited. An alternative arrangement of the gas generant along the length of the enclosure may be provided. However, any arrangement of gas generant along the enclosure preferably provides a substantially uniform average distribution of gas generant along the length of the enclosure. Examples of gas generant compositions suitable for use in the present invention are disclosed in U.S. Pat. Nos. 5,035,757, 5,872,329, 6,074,502, 6,287,400, 6,306,232 and 6,475,312, each incorporated herein by reference. Other suitable compositions are set forth in U.S. patent application Ser. Nos. 10/407,300 and 60/369,775, incorporated by reference herein. The range of suitable gas generants is not limited to those described in the cited patents.

A quantity of a known auto-ignition composition 28 may be positioned at an end of the stack of gas generant material 24, proximate enclosure first end 22a and in ignitable communication with first gas generant 24.

An igniter 26 is secured to inflator 10 such that the igniter is in communication with an interior of gas generant enclosure 22, for igniting gas generant 24 upon occurrence of a crash event. In the embodiment shown, igniter 26 is positioned within an annular bore of an igniter closure 30. Igniter 26 may be formed as known in the art. One exemplary igniter construction is described in U.S. Pat. No. 6,009,809, herein incorporated by reference.

Igniter closure 30 is crimped or otherwise fixed to a first end 14 of housing 12. A first endcap 32 is coaxially juxtaposed adjacent igniter closure 30 to form, in conjunction with igniter closure 30, an inner housing for igniter 26. First endcap 32 also provides a closure for gas generant enclosure 22. A second endcap 34 is crimped or otherwise fixed to a second end 16 of housing 12. An O-ring or other compressive seal 37 may be provided along surfaces of either (or both) of endcaps 32 and 34 residing opposite respective ends of housing 12, for providing a gas tight seal to prevent migration of inflation gases through the ends of the inflator. Endcaps 32 and 34 and igniter closure 30 may be cast, stamped, extruded, or otherwise metal-formed. Alternatively, endcaps 32 and 34 may be molded from a suitable polymer.

A filter 36 may be incorporated into the inflator design for cooling gases generated by combustion of gas generant 24 and for filtering particulates from the gases. In general, filter 36 is positioned between gas generant 24 and apertures 20 formed along inflator housing wall 18. In the embodiment shown in FIG. 1, filter 36 is positioned exterior of gas generant enclosure 22 intermediate enclosure 22 and housing wall 18 and extends between first endcap 32 and divider 92. Filter 36 substantially occupies the annular space between gas generant enclosure 22 and housing wall 18. The filter may be formed from any of a variety of materials (for example, a carbon fiber mesh, wire or sheet) known in the art for filtering gas generant combustion products.

Cavity 90 is preferably formed radially inward of housing wall 18 and is juxtaposed at one end to enclosure second end 22b and, at an opposite end, to housing end 16. Cavity 90 preferably has a greater diameter than enclosure 22 and therefore preferably accommodates a greater amount of propellant per unit length than first enclosure 22. A second gas generant composition 91, of equivalent or different composition of the first gas generant 24, is preferably randomly packed and housed within cavity 90. Second gas generant 91 extends along a second length $L_2$ which is shorter that the first length $L_1$ along which first gas generant 24 extends. Second gas generant composition 91 is arranged so as to provide a quantity of second gas generant composition having a second mass of gas generant per unit length of the second length $L_2$, the second mass of gas generant per unit length being greater than the first mass of gas generant per unit length. A quantity of a known auto-ignition composition 28 may be positioned at end 16 of housing 12, in communication with cavity 90 and in ignitable communication with second gas generant 91.

In accordance with the present invention, a plurality of gas exit apertures 40 is formed along enclosure 22 to tailor the rate of propagation of a combustion reaction of gas generant 24 along the enclosure. Apertures 40 are spaced apart along enclosure 22 as described in greater detail below and are preferably formed 180° opposite housing gas exit apertures 20, as shown in FIG. 1. Enclosure 22 may be roll formed from sheet metal and then perforated to produce apertures 40. Enclosure apertures 40 are environmentally sealed with an aluminum tape 42 or any other effective seal.

Figure 2:
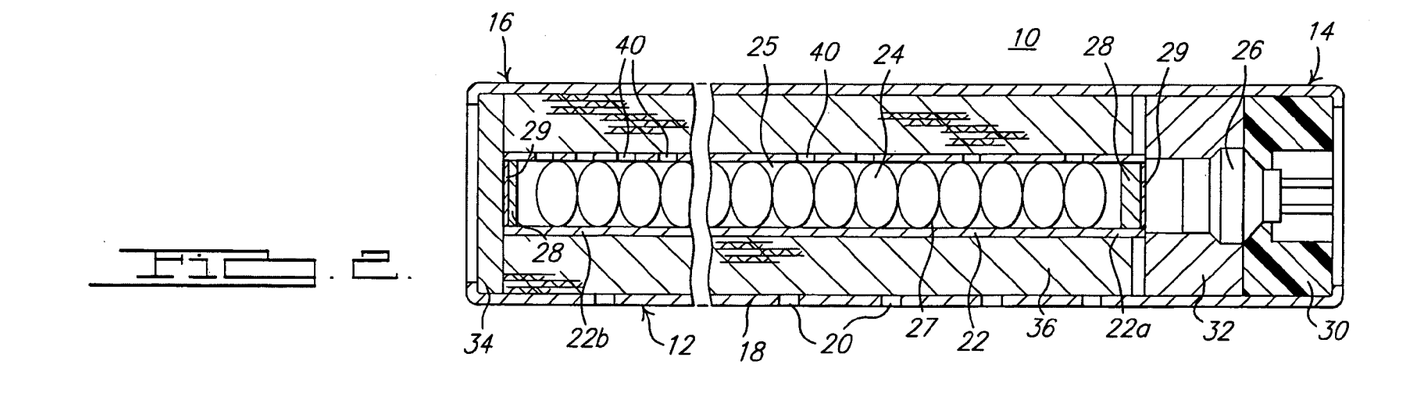
FIG. 2 is a cross-sectional side view showing an alternative inflator design used for experimental comparison to the design shown in FIG. 1.

Many delay mechanisms for controlling combustion propagation rate are recognized in pyrotechnics and explosives and may consist of a compressed composition delay that is designed to burn over a specific period of time. This approach is not sufficiently effective as employed in the present airbag inflator because of the large pressure difference between the relatively smaller diameter of first chamber 24 and the relatively larger diameter of second chamber 34. In accordance with the present invention, the combustion propagation rate of gas generant 24 in enclosure 22 is controlled by venting the enclosure so that first gas generant 24 will first burn at a relatively slower rate prior to burning of the second gas generant 91. In this way, no physical separation between the first gas generant and second gas generant is necessary. When the flame reaches the secondary gas generant, it burns very quickly and provides a burst of gas to keep the bag inflated for up to 5 seconds. FIG. 2 shows the inflator described in a previous disclosure while FIG. 1 shows the inflator described in the present invention.

As stated above, control of the combustion propagation rate along enclosure 22 is achieved by controlled venting of combustion gases generated in enclosure 22 during combustion of first gas generant 24, as per design criteria. The controlled venting may be accomplished by providing multiple groups of gas exit apertures, with the aperture sizes and the spacing between apertures varying between the groups being determined in the manner disclosed in co-owned and co-pending patent application Ser. No. 11/034,892, incorporated herein by reference. Application Ser. No. 11/034,892 describes how the sizes of and/or spacings between gas exit apertures within a given group of apertures may be varied between groups of apertures as iteratively determined based on such factors as design criteria and the length of the inflator, to achieve a predetermined combustion propagation rate within a gas generant enclosure.

Two sample inflators were constructed to illustrate the principles of the present invention.

Figure 3:
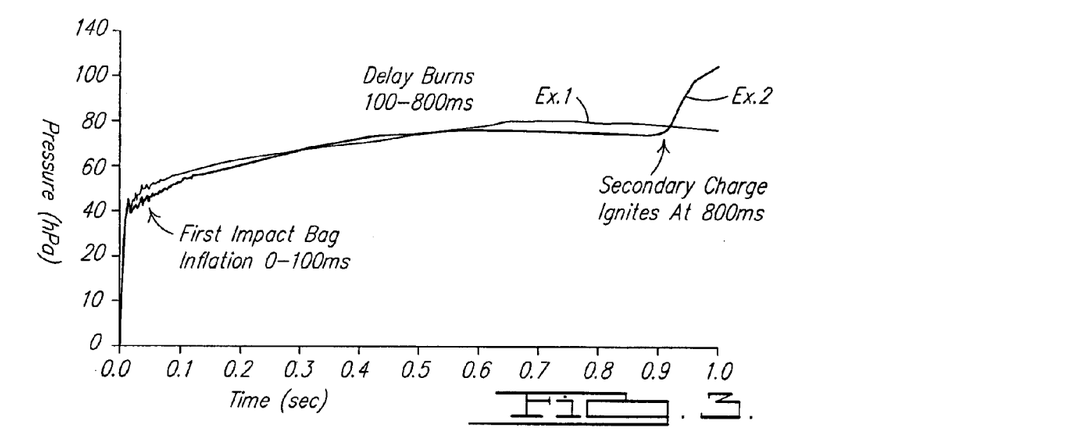
FIG. 3 and FIG. 4 are graphical representations of respective airbag inflation pressures provided by activation of the inflator designs shown in FIGS. 1 and 2.
Figure 4:
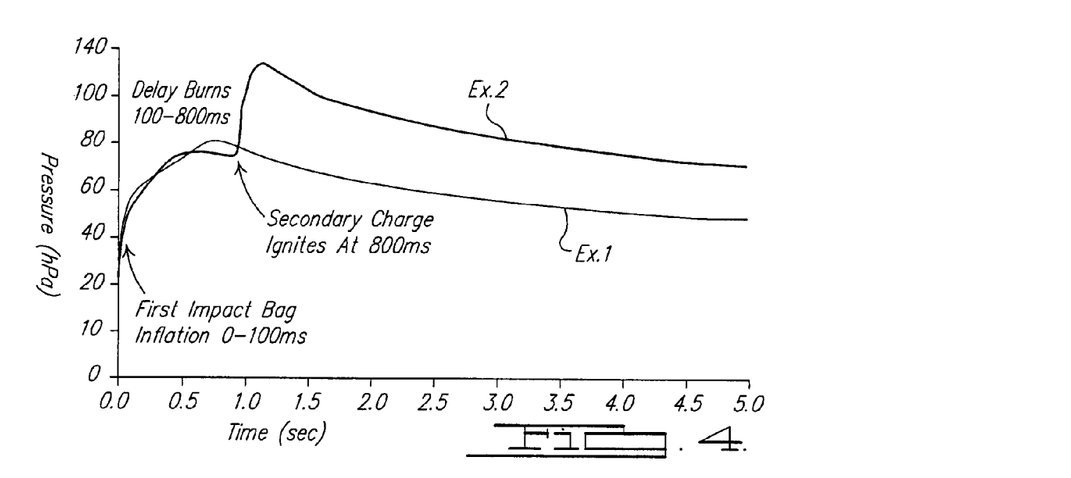

Example 1: An inflator was assembled as shown in FIG. 2. Enclosure 22 was a 48" long tube with an outer diameter of 3/8" and a wall thickness of 0.035". One row of collinear apertures 40 was drilled in the enclosure as follows: 12× diam. 4.0 mm holes 1" on center (OC) at 1-12" from one end, then 23× diam 4.0 mm holes ½" on center at 13-24" from the same end, and than 91× diam. 5.0 mm holes ¼" on center at 24.5-47" from the same end. Filter 36 was a 30 mesh/0.012" screen wrapped around the enclosure 10 times. The housing 12 had a diameter of 1" and a wall thickness of 0.035". 97 gas exit apertures of diameter ¼" were drilled in one row ½" on center along inflator housing 12. The apertures 20 of 12 were positioned 180° from the apertures 40 along enclosure 22. Enclosure 22 was loaded with 66 g of ¼" diameter by 0.165" thick propellant tablets with a dome on each side of 0.040". The inflator was in a 60 liter tank. The results are shown in FIGS. 3 and 4.

Example 2: An inflator was assembled similarly to that shown in FIG. 1. The enclosure 22 was the same as that used in Example 1 and was loaded with the same mass and type of propellant. The filter 36 was the same as used in Example 1. Housing 12 was the same as in Example 1 except that it was 6" longer to accommodate cavity 90 containing second gas generant 91. Cavity 90 was loaded with 19 g of diameter ⅜" by 0.145" thick propellant. The inflator was fired in a 60 liter tank. The results are shown in FIGS. 3 and 4.

The sum of the areas of the apertures in the first grouping of apertures (12 holes spaced 1" on center) defines a first total gas exit aperture area. The sum of the areas of the apertures in the second grouping of apertures (23 holes spaced ½" on center) defines a second total gas exit aperture area. The sum of the areas of the apertures in the third grouping of apertures (91 holes spaced ¼" on center) defines a third total gas exit aperture area. The sum of the areas of all of the apertures 40 formed along enclosure 22 defines a total gas exit aperture area. The sum of the areas of all of the apertures 20 formed along housing 12 defines a total housing gas exit aperture area.

The term "on center" (OC) is defined as the distance from the center point of one aperture to the center point of an adjacent aperture. The sizes of the holes or gas exit apertures preferably ranges from about one millimeter to about one-half the diameter of the propellant tube. Holes smaller than one millimeter are often difficult to manufacture with consistent size and with the desired efficiency. Holes or gas exit apertures larger than half the diameter of the propellant tube weaken the structure of the tube and are therefore relatively difficult to produce.

The gas exit apertures are preferably spaced about six millimeters to twenty-six millimeters on center. A spacing less than about six mm. may weaken the structure, and presents a further structural concern if the local or associated gas exit aperture size is relatively large or close to the diameter of the propellant tube. Spacing larger than twenty-six mm. may be employed although the efficiency of the cooling screen may consequently be reduced.

FIGS. 3 and 4 show the effects of controlled venting of combustion gases from enclosure 22 using the predefined pattern of gas exit apertures described in detail above. FIGS. 3 and 4 also show the effects of incorporating a second combustion chamber (i.e., cavity 90) into the inflator design, as described herein.

Combustion of the first gas generant 24 produces an inflation gas resulting in a tank pressure of at least a first predetermined minimum internal pressure, whereby the tank pressure is directly related to a corresponding desired airbag pressure. It will be appreciated that tailoring the composition of the gas generant, the length of enclosure 22, or both, as iteratively determined, provides tailoring of the associated airbag inflation pressure over a unit length of time. The size of enclosure 22 and the size of cavity 90 may be tailored to modify the respective propellant capacity and the associated airbag inflation profile. As shown in FIG. 1, second gas generant 91 extends along a second length $L_2$ which is shorter than the first length $L_1$ along which first gas generant 24 extends. Second gas generant composition 91 is positioned in a housing cavity 90 adjacent the enclosure 22 so as to enable combustion of the second gas generant composition 91 in response to combustion of the first gas generant composition 24. The second gas generant composition (91) is arranged so as to provide a quantity of second gas generant composition having a second mass of gas generant per unit length of the second length $L_2$, the second mass of gas generant per unit length being greater than the first mass of gas generant per unit length. The second gas generant composition (91) is also configured to combust to generate inflation gas providing at least a second predetermined minimum internal pressure in the housing, the second predetermined minimum internal pressure being higher than the first predetermined minimum internal pressure.

In certain applications, such as a side-curtain for rollover protection, it is desirable to have an airbag that remains inflated for up to 5-10 seconds. In addition, the same airbag must protect the occupant during the "first impact" stage of an accident, which is typically 0-100 msec. Prior art devices have addressed this problem by using a stored gas inflator with a sealed air bag. In this case, the gas bottle produces relatively cool gas in a short period of time-generating enough pressure to protect the occupant from 0-100 msec. Since the bag is sealed and the gas is cool, the gas pressure in the bag at 5 seconds after impact typically drops to about 50% of the pressure generated during the first impact. The pressure drops primarily because the gas temperature decreases due to heat transfer. As described below, in the present invention a pressure surge provided by the combustion of second gas generant 91 in cavity 90 delays the pressure drop in an airbag fluidly coupled to the inflator, enabling the inflator to remain inflated for a relatively extended period.

As combustion of first gas generant 24 nears completion (after which inflator housing internal pressure will begin to drop), flame from combustion of the first gas generant composition 24 reaches the end 22b of the enclosure 22 and contacts the second gas generant composition 91, igniting the second gas generant 91 and producing a burst of gas, resulting in an increase in inflator housing internal pressure. Gas exit apertures 20 along the housing 12 are sized such that the housing internal pressure is maintained at at least the first predetermined minimum level during passage of a predetermined time period after inflator activation.

EXAMPLE 1

As seen in FIG. 3 (0-1.0 sec. time frame) and FIG. 4 (0-5 sec. time frame), the "first impact" inflator tank pressure in the inflator of Example 1 is constant at 60-75 kPa from 0-100 msec. This is the time period in which the occupant first contacts the bag from an initial impact. In Example 1, the gas generant along about ⅔ of the length of enclosure 22 has been consumed in approximately 100 msec. The gas generant in the remaining ⅓ of the length of the enclosure burns more slowly from 100 msec to 900 msec. At about 900 msec. after igniter activation, the combustion of the first gas generant in Example 1 is complete and the inflator internal pressure begins to decrease as the gas cools.

EXAMPLE 2

As seen in FIG. 3 (0-1.0 sec. time frame) and FIG. 4 (0-5 sec. time frame), the "first impact" tank pressure relative to the inflator of Example 2 is constant at 60-75 kPa from 0-100 msec. This is the time period in which the occupant first contacts the bag from an initial impact. The gas generant along about ⅔ of the length of enclosure 22 has been consumed in approximately 100 msec. The gas generant in the remaining ⅓ of the length of the enclosure burns more slowly from 100 msec to 900 msec. In Example 2, at about 900 msec. after igniter activation, the flame from combustion of first gas generant 24 reaches cavity 90 and ignites second gas generant 91, producing a burst of gas for about 200 msec. At approximately 5 seconds after igniter activation, the tank pressure from example 1 is about 70 kPa while that from Example 2 is about 90 kPa. The pressure surge provided by the combustion of second gas generant 91 in cavity 90 delays the pressure decrease over time of an airbag fluidly coupled to the inflator, thereby enabling the airbag to remain inflated for a relatively extended period.

Venting of combustion gases in enclosure 22 is believed to operate as follows. It is believed that after igniter 26 is activated, the propagation rate of the combustion reaction along the enclosure is dependent upon the number of apertures 40 and the spacing between the apertures along enclosure 22. More specifically, it is believed that, along the sections of the enclosure where the aperture spacing is 1" OC, the combustion reaction propagates via hot gases because the pressure inside this portion of the enclosure is relatively high due to the relative shortage of apertures to relieve the pressure; thus, there is a driving pressure force urging the hot gases further down the enclosure. In the sections where the aperture spacing is ½" OC, the combustion reaction still propagates via hot gases but at a slower rate because the internal pressure is relatively lower, due to the shorter distance between apertures. In the sections where the aperture spacing is ¼" OC, apertures 40 are relatively numerous, permitting the enclosure internal pressure to be more easily relieved; thus, there is minimal driving pressure force urging the hot gases further down the length of the enclosure. In this case, the combustion reaction continues to propagate at a relatively slower rate as each tablet 24 ignites the next adjacent tablet as it burns.

Along portions of the enclosure having a relatively greater spacing between enclosure apertures 40, the more rapid propagation of the combustion reaction results in a more rapid burning of the gas generant and, thus, a more rapid generation of inflation gas, and more rapid inflation of an associated airbag, for example. Therefore, to affect the propagation rate of a combustion reaction along a portion of the enclosure, the apertures along the portion of the enclosure may be spaced apart a distance proportional to a desired rate of propagation of a combustion reaction of gas generant positioned between the apertures. The combustion propagation rate may be tailored using an appropriate arrangement of enclosure apertures, to accommodate greater or lesser desired airbag inflation rates, and also to accommodate desired shorter or longer inflation durations.

Because propagation of the combustion reaction within enclosure 22 is controlled by venting, no physical separation or barrier is required between first gas generant 24 and second gas generant 91.

It is noted that the stacking of substantially uniform gas generant tablets 24 adjacent each other along enclosure 22 provides for a relatively constant average density of gas generant along the enclosure. Also, the use of an enclosure having a substantially constant cross-sectional area along the length of the enclosure provides for a substantially constant volume per unit length of the enclosure. These features aid in minimizing pressure variations within the enclosure due to such factors as variations in enclosure volume, and localized hot spots and higher pressure regions resulting from disparities in gas generant distribution along the enclosure. The dome-shaped faces of each propellant tablet further facilitates an ease of assembly in that each dome-shaped face provides a pivot point at its apex that physically communicates with the apex of an adjacent tablet's propellant face. Accordingly, by virtue of the pivot point created on each dome-shaped face, the same juxtaposed orientation of each propellant tablet is assured without undue complication.

In alternative embodiments as exemplified in FIG. 6, inflator 10 may be provided with an arrangement of multiple alternating enclosures 22 and cavities 90 as described above, all in fluid communication with each other and with housing gas exit apertures 20. Enclosures 22 having a relatively smaller diameter may be arranged in alternating fashion with cavities 90 to provide a longitudinal, fluidly contiguous combustion chamber having a diameter alternating between the relatively smaller diameter of enclosures 22 and the relatively larger diameters of cavities 90. The desired arrangement of alternating enclosures 22 and cavities 90 is designed to provide a predetermined inflation profile according to design requirements. It will be appreciated that tailoring the composition of gas generants 24 and 91, the sizes of enclosures 22, and/or the sizes of cavities 91 may be varied as iteratively determined to provide tailoring of the associated airbag inflation pressure over a unit length of time.

Figure 5:
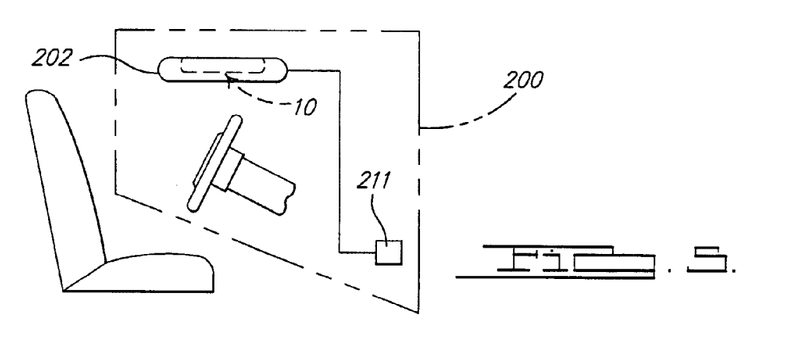
FIG. 5 is a schematic representation of an exemplary vehicle occupant restraint system incorporating an inflator in accordance with the present invention.

Referring now to FIG. 5, a gas generator constructed in accordance with the principles outlined above may be incorporated into an exemplary gas generating system such as a vehicle occupant restraint system 200. Vehicle occupant restraint system 200 includes at least one airbag 202 and an inflator 10 constructed in accordance with the present invention and coupled to airbag 202 so as to enable fluid communication with an interior of the airbag. Vehicle occupant restraint system 200 may be in operative communication with a crash event sensor 211 which communicates with a known crash sensor algorithm that signals activation of vehicle occupant restraint system 200 via, for example, activation of airbag inflator 10 in the event of a collision.

It should be understood that the preceding is merely a detailed description of one embodiment of this invention and that numerous changes to the disclosed embodiment can be made in accordance with the disclosure herein without departing from the spirit or scope of the invention. For example, the relative amounts of gas generant in enclosure 22 and in cavity 90 may be different from the amounts disclosed in the above examples, according to the desired inflation profile for the inflator. The preceding description, therefore, is not meant to limit the scope of the invention. Rather, the scope of the invention is to be determined only by the appended claims and their equivalents.

What is claimed is:

1. An inflator for use in an inflatable vehicle occupant protection system, the inflator comprising:
a longitudinal inflator housing including a perforated section to enable fluid communication between an interior of the housing and an exterior of the housing;
an enclosure extending along at least a portion of the housing interior, the enclosure having a substantially uniform cross-sectional area along at least a portion of the enclosure, the enclosure including at least first and second perforated sections to enable fluid communication between the enclosure and an exterior of the enclosure, the first perforated section having a first total gas exit aperture area and the second perforated section having a second total gas exit aperture area, the second total gas exit aperture area being greater than the first total gas exit aperture area;
a first gas generant composition positioned within the at least a portion of the enclosure to extend along a first length, the first gas generant composition being distributed substantially uniformly along the at least a portion of the enclosure so as to provide a quantity of first gas generant composition having a first mass of gas generant per unit length of the first length; and
a second gas generant composition positioned within a cavity so as to enable combustion of the second gas generant composition in response to combustion of the first gas generant composition, the second gas generant composition extending along a second length so as to provide a quantity of second gas generant composition having a second mass of gas generant per unit length of the second length, the second mass of gas generant per unit length being greater than the first mass of gas generant per unit length.

2. The inflator of claim 1 wherein the first perforated section includes a first plurality of gas exit apertures extending along the at least a portion of the enclosure, each aperture of the first plurality of gas exit apertures having an area;
the second perforated section includes a second plurality of gas exit apertures extending along the at least a portion of the enclosure, each aperture of the second plurality of gas exit apertures having an area,
and wherein the first total gas exit aperture area is a sum of the areas of the apertures in the first plurality of gas exit apertures, and the second total gas exit aperture area is a sum of the areas of the apertures in the second plurality of gas exit apertures.

3. The inflator of claim 2 wherein the apertures in the first plurality of gas exit apertures are substantially evenly spaced apart, each of the apertures in the first plurality of gas exit apertures being spaced apart a first distance from adjacent ones of the apertures, the apertures in the second plurality of gas exit apertures are substantially evenly spaced apart, each of the apertures in the second plurality of gas exit apertures are spaced apart a second distance from adjacent ones of the apertures, and wherein the first distance is greater than the second distance.

4. The inflator of claim 2 wherein the gas exit apertures formed along the at least a portion of the enclosure are substantially collinear.

5. The inflator of claim 2 wherein the at least a portion of the enclosure has a diameter, the apertures of the first plurality of gas exit apertures are spaced apart about six millimeters on center to about twenty-six millimeters on center, and the apertures of the first plurality of gas exit apertures are sized from about one millimeter to about one half the diameter of the at least a portion of the enclosure.

6. The inflator of claim 1 wherein the enclosure further includes at least a third perforated section to enable fluid communication between the enclosure and an exterior of the enclosure, the third perforated section having a third total gas exit aperture area different from both the first total gas exit aperture area and the second total gas exit aperture area.

7. The inflator of claim 6 wherein the third perforated section includes a third plurality of gas exit apertures extending along the at least a portion of the enclosure, each aperture of the third plurality of gas exit apertures having an area, the third total gas exit aperture area is a sum of the areas of the apertures in the third plurality of gas exit apertures.

8. The inflator of claim 1 wherein the first gas generant composition is the same as the second gas generant composition.

9. The inflator of claim 1 wherein the total mass of first gas generant composition in the inflator is substantially equal to the total mass of second gas generant composition in the inflator.

10. The inflator of claim 1 wherein the first gas generant is in the form of a plurality of adjacent gas generant tablets positioned along the at least a portion of the enclosure, and wherein at least a portion of the gas generant tablets are dome-shaped so as to provide a cavity between adjacent ones of the at least a portion of the gas generant tablets.

11. The inflator of claim 1 wherein the second gas generant composition is positioned in a cavity formed adjacent the enclosure.

12. The inflator of claim 11 wherein the enclosure extends along a first portion of the inflator and the cavity extends along a second portion of the inflator adjacent the first portion of the inflator.

13. The inflator of claim 11 wherein the at least a portion of the enclosure has a diameter and the cavity has a diameter greater than the diameter of the at least a portion of enclosure.

14. The inflator of claim 1 wherein the enclosure extends along a first portion of the inflator and the second gas generant composition extends along a second portion of the inflator adjacent the first portion of the inflator.

15. The inflator of claim 1 wherein the second gas generant composition is positioned in a cavity in fluid communication with an interior of the enclosure.

16. The inflator of claim 1 wherein the at least first and second perforated sections of the enclosure are substantially collinear and are positioned substantially diametrically opposite the perforated section of the housing.

17. The inflator of claim 1 wherein the first gas generant composition is in fluid communication with the second gas generant composition prior to activation of the inflator.

18. A vehicle occupant restraint system comprising:
an airbag system having at least one airbag and an inflator coupled to the airbag so as to enable fluid communication with an interior of the airbag upon activation of the inflator, the inflator including:

a longitudinal inflator housing including a perforated section to enable fluid communication between an interior of the housing and an exterior of the housing;

a longitudinal enclosure extending along at least a portion of the housing interior, the longitudinal enclosure having a substantially uniform cross-sectional area along at least a portion of the longitudinal enclosure, the longitudinal enclosure including at least first and second perforated sections to enable fluid communication between the longitudinal enclosure and an exterior of the longitudinal enclosure, the first perforated section having a first total gas exit aperture area and the second perforated section having a second total gas exit aperture area, the second total gas exit aperture area being greater than the first total gas exit aperture area;

a first gas generant composition positioned within a first portion of the longitudinal enclosure to extend along a first length, the first gas generant composition being distributed substantially uniformly along the at least a portion of the longitudinal enclosure so as to provide a quantity of first gas generant composition having a first mass of gas generant per unit length of the first length; and a second gas generant composition positioned within a cavity so as to enable combustion of the second gas generant composition in response to combustion of the first gas generant composition, the second gas generant composition extending along a second length so as to provide a quantity of second gas generant composition having a second mass of gas generant per unit length of the second length, the second mass of gas generant per unit length being greater than the first mass of gas generant per unit length.

* * * * *